United States Patent [19]

Wakimoto et al.

[11] 4,360,611

[45] Nov. 23, 1982

[54] FINE SPHERICAL POLYMER PARTICLES AND PROCESS FOR THE PREPARATION THEREOF

[75] Inventors: Saburo Wakimoto, Hayama; Sadayasu Miyahara, Fujisawa; Yoshihiko Hyosu, Sagamihara, all of Japan

[73] Assignee: Sinloihi Company Limited, Osaka, Japan

[21] Appl. No.: 199,207

[22] Filed: Oct. 21, 1980

[30] Foreign Application Priority Data

Oct. 23, 1979 [JP] Japan ................................ 55-135922

[51] Int. Cl.$^3$ ............................................... C08K 9/02
[52] U.S. Cl. .................................... 523/216; 524/430; 524/447; 526/910
[58] Field of Search ............... 526/194, 201, 910, 202, 526/203, 210, 214; 260/42.53, 29.6 H, 29.6 HN, 29.6 SQ; 430/137; 523/216

[56] References Cited

U.S. PATENT DOCUMENTS

| | | | |
|---|---|---|---|
| 2,934,530 | 4/1960 | Ballast et al. | 526/194 |
| 3,287,305 | 11/1966 | Maeder | 260/29.6 H |
| 3,634,251 | 1/1972 | Maeda et al. | 260/42.53 |
| 3,691,140 | 9/1972 | Silver | 260/29.6 H |
| 3,926,890 | 12/1975 | Huang | 260/29.6 H |
| 4,071,670 | 1/1978 | Vanzo et al. | 260/42.53 |
| 4,100,229 | 7/1978 | Schwartz | 260/42.53 |
| 4,234,466 | 11/1980 | Takahashi et al. | 260/42.53 |
| 4,269,760 | 5/1981 | Wakimoto | 260/42.53 |
| 4,314,932 | 2/1982 | Wakimoto | 260/42.53 |

Primary Examiner—Paul R. Michl
Attorney, Agent, or Firm—Bucknam and Archer

[57] ABSTRACT

A suspension polymerization of polymerizable monomers containing a prepolymer is conducted in a system containing an inorganic dispersion stabilizer and occasionally, an inorganic pigment and/or black coloring agent, in which the polymerizable monomers have an opposite charge in water to the inorganic dispersion stabilizer whereby the former is ionically bound with the latter. The suspension polymerization during the middle stage in which polymer particles are apt to stick together is stabilized and the polymer particles are prevented from coalescing so that fine spherical polymer particles are obtained with a uniform particle size distribution.

Also, the suspension polymerization is conducted having liquid resins involved in polymerizable monomers thereby to obtain non-sticky, free flowing particles. These particles adhere to paper sheets by mechanically smashing.

2 Claims, 2 Drawing Figures

FINE SPHERICAL POLYMER PARTICLES AND PROCESS FOR THE PREPARATION THEREOF

BACKGROUND OF THE INVENTION

This invention relates to fine spherical polymer particles having a uniform particle size distribution and containing a prepolymer and if desired, an inorganic pigment and/or black coloring agent and a resin liquid at normal temperature, which are obtained by effecting polymerization in a stable suspension system free of coalescence of particles and to a process for preparing the same.

In conventional methods for conducting a suspension polymerization in water, a suspending agent is used to prevent polymer particles from coalescing during the progress of polymerization.

Generally, the suspending agents are classified broadly to a water-soluble high molecular substance and fine powders of difficultly soluble inorganic compound, the former being gelatine, starch, polyvinyl alcohol and others, the latter being difficultly soluble salts such as $BaSO_4$, $CaSO_4$, $BaCO_3$, $CaCO_3$, $MgCO_3$ and $Ca_3(PO_4)_2$, inorganic high molecules such as talc, clay, silicic acid and diatomic earth and powdery metal oxides.

The suspension polymerization method for obtaining polymer particles containing an inorganic pigment or coloring agent is disclosed in, for example, U.S. Pat. No. 3,634,251 and Japanese Patent Publication No. 10231/61, in which the suspending agent used is adsorbed to polymer particles or dispersed between particles.

In addition to the selection of suspending agent, stirring is an important requirement for suspension polymerization, according to which particle size and polymerization stability are determined. Stirring at a low speed brings about gelation so that polymer particles cannot be obtained. On the contrary stirring at a high speed results in formation of polymer particles with a small size, however air penetrates into a polymerization vessel through a stirring apparatus so that the yield and degree of polymerization are reduced due to the hindrance effect of oxygen on reactive monomer radicals.

Connected with this is a problem of liquid ratio (polymerization monomers: water), which is usually in the range of 1:5 to 1:8. If water is little and monomers are much, the polymerization reaction product is allowed to gel and the particle size distribution is broad in general.

It is very difficult to obtain polymer particles of less than $30\mu$ in size on a commercial scale by conventional suspension polymerization methods. Since polymer particles become more sticky due to increasing viscosity during the progress of polymerization, coalescence of particles is unavoidable even under stirring so that particle sizes become large or gelation occurs. For avoiding such phenomena other additives are used in addition to the suspending agent. There are used a method of adding glycols or glycerine thereby to prevent particles from coalescing or a method of adding electrolytes such as NaCl or $Na_2SO_4$ so as to increase interfacial tension between water and particles. However, satisfactory effects have not been obtained yet.

SUMMARY OF THE INVENTION

An object of this invention is to provide fine spherical polymer particles of a uniform particle size distribution by stabilizing suspension polymerization during the middle stage in which polymer particles are apt to stick together and preventing the polymer particles from coalescing.

Another object of this invention is to provide fine spherical polymer particles having a prepolymer included therein, which are non-sticky, free flowing particles but adhesive to paper sheets by mechanically smashing.

A further object of this invention is to provide a process for the preparation of fine spherical polymer particles by effecting polymerization in a stabilized suspension system free of coalescence of particles.

In accordance with this invention, there are provided fine spherical polymer particles with a uniform particle size distribution containing a prepolymer and if desired, an inorganic pigment and/or black coloring agent, which comprises polymerized products from polymerizable monomers and an inorganic dispersion stabilizer in which the polymerizable monomers are charged with cation or anion and the inorganic dispersion stabilizer has an opposite charge to said monomers, the surface of polymer particles being firmly bound through ionic bond to and completely covered with the inorganic dispersion stabilizer.

Also, in accordance with this invention, there is provided a process for the preparation of fine spherical polymer particles with a uniform particle size distribution containing a prepolymer and if desired, an inorganic pigment and/or black coloring agent, which comprises effecting a suspension polymerization of a combination of polymerizable monomers and inorganic dispersion stabilizer, in which the polymerizable monomers are charged in water (a) with cation by adding a cationic polymerizable monomer or difficultly water soluble organic amine or (b) with anion by adding an anionic polymerizable monomer and the inorganic dispersion stabilizer in water has an opposite charge to the polymerizable monomers, the suspension polymerization being under such a condition that the polymerizable monomers are ionically bound to and covered with the inorganic dispersion stabilizer.

Further, in accordance with this invention, there are provided fine spherical polymer particles of a uniform particle size distribution having liquid resins involved therein by incorporating a resin liquid at normal temperature into the above polymerizable monomer and effecting a suspension polymerization in combination with the inorganic dispersion stabilizer as mentioned above.

DETAILED DESCRIPTION OF THE INVENTION

Figure 1:
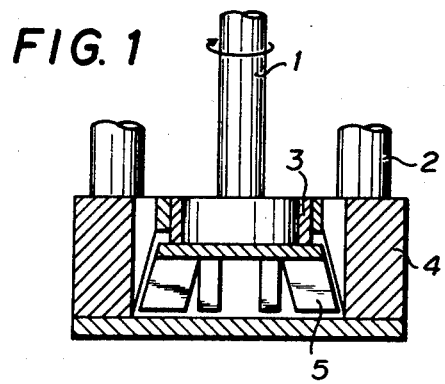
FIG. 1 represents a sectional view of TK Homomixer of a high shearing and stirring force used in a suspension polymerization according to this invention.

In the suspension polymerization according to this invention, the interface of polymerizable monomer particles is charged with cation or anion in water, while the inorganic dispersion stabilizer in water has an opposite charge to said polymerizable monomer particles. Therefore, the suspended polymerizable monomer particles and inorganic dispersion stabilizer interact to form stable agglomerates. The interface of polymerizable monomer particles are ionically bound to and uniformly covered with the inorganic dispersion stabilizer so that the particles are prevented from coalescing. The manner of ionically binding the inorganic dispersion stabilizer firmly to the polymerizable monomers is superior to conventional methods of adsorbing simply a dispersing agent onto polymer particles or dispersing same between particles to avoid coalescence. Accordingly, during the initial and middle period of polymerization during which polymer particles are apt to stick together, the interface of the particles is firmly bound through ionic bond and completely covered with the non-sticky inorganic dispersion stabilizer so that the coalescence of particles is not observed.

Polymerizable monomers which are usually used may be used for the purpose of this invention. Examples include styrene, α-chlorostyrene, acrylonitrile, methacrylonitrile, methyl methacrylate, vinyl chloride, methyl acrylate, ethyl methacrylate, ethyl acrylate, butyl methacrylate, butyl acrylate, 2-ethylhexyl methacrylate, 2-ethylhexyl acrylate, stearyl methacrylate, vinyl acetate, divinyl benzene, ethylene glycol dimethacrylate, trimethylolpropane triacrylate, trimethylolethane triacrylate, tetramethylolmethane tetracrylate and others.

Ionic substances which may be used for the suspension polymerization of this invention are as follows:

(a) Cationic substance a-1 Cationic polymerizable monomers:

A nitrogen containing polymerizable monomer such as dimethylaminoethyl methacrylate, dimethylaminoethyl acrylate, 2-hydroxy-3-methacryloxypropyltrimethyl ammonium chloride, 2-hydroxy-3-acryloxypropyltrimethyl ammonium chloride, diacetoneacrylamide, acrylamide, N-vinylcarbazole, vinylpyridine, 2-vinylimidazole, diethylaminoethyl methacrylate, diethylaminoethyl acrylate, N-n-butoxyacrylamide and others.

a-2 Difficultly water soluble organic amines:

a-2-1 Aliphatic primary amines:

Aliphatic primary amines of 7 or more carbon atoms, for example, heptylamine, octylamine, dodecylamine and the like.

a-2-2 Aliphatic secondary amines:

Aliphatic secondary amines having a boiling point of more than about 80° C., for example, dipropylamine, diisopropylamine, dibutylamine, diamylamide, didodecylamine and others.

a-2-3 Aliphatic tertiary amines:

Aliphatic tertiary amines having a boiling point of more than about 80° C., e.g. triethylamine, tripropylamine, tributylamine, triamylamine, n-dodecyldimethylamine, n-tetradecyldimethylamine and others.

a-2-4 Aromatic amines:

Aniline, methylaniline, dimethylaniline, ethylaniline, diethylaniline, toluidine, dibenzylamine, tribenzylamine, diphenylamine, triphenylamine, naphthylamine and others.

The primary, secondary and tertiary amines are used in the form of an acidic aqueous solution.

(b) Anionic polymerizable monomers:

2-Acrylamide-2-methylpropanesulfonic acid, N-methylolacrylamide, methacrylic acid, acrylic acid, 2-hydroxyethylmethacrylate, 2-hydroxypropylmethacrylate, glycidylmethacrylate, polypropylene glycol monomethacrylate, polyethyleneglycol monomethacrylate, tetrahydrofurylmethacrylate, acid-phosphoxyethylmethacrylate and others.

Requirement for the above-mentioned ionic substances is to coexist in the above-mentioned polymerizable monomers and therefore, water soluble organic amines cannot be used. However, the above-mentioned ionic polymerizable monomers, even if water soluble, are copolymerized during the progress of polymerization to become a part of polymeric particles so that these monomers are not present in the aqueous layer.

These ionic substances may be used within the range of more than about 0.1%, preferably about 0.2% by weight of the polymerizable monomers. Though the upper limit is not particularly defined, with use of more than about 5% by weight the stability of polymerization and the particle size distribution are not further improved.

Inorganic dispersion stabilizers which may be used in this invention include, for example, colloidal silica ($SiO_2$), bentonite ($SiO_2/Al_2O_3$) and others as an anionic substance and aluminum oxide ($Al_2O_3$) as a cationic substance.

The inorganic dispersion stabilizer exhibits sufficient effects in a less amount as micronized to finer particles. Aerosil (the trade name of colloidal silica sold by Degussa, West Germany) consists of the primary particle having an average size of 7 m$\mu$–40 m$\mu$ and has a pH of 3.6–4.3 at a 4.0% concentration in water. Aluminum Oxide C (the trade name of aluminum oxide sold by Degussa, West Germany) consists of the primary particle of 20 m$\mu$ in average size having an isoelectric point pH of about 9 and is used in neutral or acidic side. The inorganic dispersion stabilizer is used in the range of more than about 0.1 phr, preferably about 0.2 phr by weight of polymerizable monomers or ones having a resin liquid at normal temperature and/or a prepolymer involved therein. Though the upper limit is not particularly defined, with use of more than about 2.0 phr by weight the stability of polymerization and the particle size distribution are not further improved.

Examples of inorganic pigments which may be used are powders of metals such as iron, nickel, manganese and cobalt, powders of a metal alloy of iron, nickel, manganese, cobalt, aluminum, copper, lead, magnesium, tin, zinc, gold, silver, antimony, cadmium, calcium, selenium, titanium, tungsten, zirconium and others and mixtures thereof, metal oxides such as iron oxide, aluminum oxide, nickel oxide, chrome oxide, zinc oxide, titanium oxide, magnesium oxide and zirconium oxide, ferrite, blanc fixe, zinc white, white lead, zinc sulfide, lead yellow, zinc yellow, cadmium yellow, ultramarine, prussian blue, zinc green and so forth. The inorganic pigments are used alone or in mixture and their particle size is preferably, less than 1$\mu$, preferably, 0.1–0.5$\mu$. They are used in an amount of preferably, 0.1–70%, preferably 3–60% by weight of polymerizable monomers or monomers having a resin liquid at normal temperature and/or a prepolymer involved therein. With amounts of less than 0.1% by weight the desired effects cannot be obtained, while with amounts of more than 70% by weight it is difficult to fix the inorganic pigment into the polymer particles and the particle size distribution becomes broad.

Black coloring agents which may be used are, for example, carbon blacks such as channel black, roller black, furnace black and thermal black and black coloring dyestuffs selected from the dyes of direct dyes, acid dyes, basic dyes, dispersed dyes, oil colors and the like.

They are used alone or in mixture in an amount of preferably, 0.1–60%, preferably, 3–50% by weight of polymerizable monomers or ones having a resin liquid at normal temperature and a prepolymer involved therein. With amounts of less than 0.1% by weight the desired effects cannot be obtained, while with amounts of more than 60% by weight it is difficult to fix the black coloring agent into the polymer particles and the particle size distribution becomes broad.

Both of the inorganic pigment and the black coloring agent may be used in any combination. The total amount is within the range of preferably, 0.1–60%, more preferably 3–50% by weight of polymerizable monomers containing the liquid resin and/or the prepolymer. With an amount of less than 0.1% the effect is little, whereas with an amount of more than 60% it is difficult to fix these two components into the polymer particles and the particle size distribution becomes broad.

As for a polymerization initiator the conventional oil-soluble initiators may be used in the range of conventional temperatures. Examples of the initiator include benzoyl peroxide, lauroyl peroxide, 2,2′-azobisisobutyronitrile, 2,2′-azobis-(2,4-dimethylvaleronitrile), o-chlorobenzoyl peroxide, o-methoxybenzoyl peroxide and so forth. Polymerization may be carried out under normal pressure or elevated pressure.

Next, the characteristics of the suspension polymerization according to this invention will be explained as follows: Temperature is elevated to a certain temperature under stirring and then, polymerization is commenced. When a sample after commencement of polymerization is taken up on a glass plate, it is observed by microscope that the polymer particle size is growing fine and uniform. After 15–30 minutes from the commencement of polymerization the particle size has a broad distribution of from fine particles to coarse particles. However, after 30–60 minutes coarse particles disappear and all the particles become fine. Thereafter, the polymer particle size remains unchanged till completion of polymerization.

On the contrary, in the method of using conventional suspending agents, when a sample during the beginning of polymerization is taken up on a glass plate, particles immediately coalesce to a few large agglomerates so that the measurement of particle size is impossible. Since particles coalesce during the latter period of polymerization, an exact measurement of particle size is impossible. The particle size after completion of polymerization has broad distribution of from fine particles to coarse ones.

It is considered from the foregoing that the stability of suspension in the conventional methods relies chiefly on mechanical stirring and the coalescence and dispersion of particles are repeated so that the particle size distribution becomes broad. In the process according to this invention, however, the electrical and chemical stabilizing effect is very strong and mechanical stirring serves subsidiarily only. Therefore, there is little coalescence of particles so that a narrow distribution of particle size is easily obtained.

The significance of this invention is, thus, that the conventional idea that the stabilisation of fine particles in suspension polymerization requires a very difficult operation has completely been wiped out.

Though not bound by a theoretical explanation, the mechanism of the electrical and chemical stabilizing effect according to this invention will be explained as follows:

(1) Bentonite and colloidal silica contain a slight amount of a silanol group —SiOH and dissociate in water to form —SiO$^-$H$^+$. Thus, they are charged with negative electricity and rendered anionic in water. Therefore polymerizable monomers containing a cationic substance are firmly bound ionically to and covered completely with the above anionic dispersion stabilizer. Namely, the anionic stabilizer present at the interface of the polymerizable monomer particles forms a hydrated phase around the particles so that they are remarkably stabilized. Thus, during the initial and middle stage of polymerization at which polymer particles are apt to stick together, the interface of particles are completely covered with the non-sticky, inorganic dispersion stabilizer and accordingly, the coalescence of particles is not observed.

(2) Aluminum oxide having an isoelectric point at pH of about 9 is charged with positive electricity in neutral and acidic sides and rendered cationic. Therefore polymerizable monomers containing an anionic polymerizable monomer are ionically bound firmly to and covered completely with the above cationic dispersion stabilizer.

The fact that the polymer particles of this invention have an interfacial structure having the inorganic dispersion stabilizer bound firmly through ionic bond thereto has been confirmed by electrophoresis as described hereinafter. It has been made clear that a sample using the anionic dispersion stabilizer is transferred to the anode and the slipping plane around particles (the particle surface when dried) is charged with negative electricity. It has, also, been made clear that a sample using the cationic dispersion stabilizer is transferred to the cathode and the particle transfer surface is charged with positive electricity.

The suspension polymerization according to this invention has the following advantages:

(1) By varying properly a stirring speed, amounts of ionic substance and inorganic dispersion stabilizer, it is possible to properly determine the particle size.

(2) Polymers obtained have a narrow particle size distribution because of no coalescence.

(3) Since the ratio of polymer particles to water can be increased in suspension polymerization, a large improvement in productivity becomes possible.

(4) Polymerization can be conducted under a low speed stirring.

Polymer particles having a prepolymer involved therein are obtained by mixing polymerizable monomers with the prepolymer and conducting suspension polymerization. It has been found that the particles obtained are non-sticky, free-flowing particles and have properties of paraffin resins. Also, when uniformly placed on a paper sheet and passed between pressed metal rollers, the particles are allowed to adhere to the sheet and the coat obtained has flexibility. The prepolymer which may be used in this invention is, for example, a polybutadiene type prepolymer such as butadiene homopolymer, α,ω-polybutadiene glycol, α,ω-polybutadiene dicarboxylic acid, maleic-modified polybutadienes, terminally acrylic-modified polybutadienes and terminally half-esterified polybutadienes or a prepolymer of 1000–5000 in molecular weight obtained by polymerizing the above-mentioned polymerizable monomer alone or in mixture of two or more. The prepolymer may be used alone or in mixture of two or more.

These polybutadienes have properties of polyolefin resins originating from their inherent chemical structure and accordingly, render polymer particles non-sticky and free-flowing. An amount of the prepolymer may be within the range of 5–99.5% by weight based on the weight of polymerizable monomers. With an amount of less than 5% the effect obtained is little, whereas with an amount of 99.5% controlling of polymer particles in particle size becomes difficult.

Further, polymer particles having a resin liquid at normal temperature (hereinafter referred to as a liquid resin) involved therein are obtained by mixing the liquid resin with polymerizable monomers and conducting the suspension polymerization according to this invention. The particles obtained are non-sticky, free-flowing particles and do not melt in boiling water. On the other hand, when these particles are taken up on a watch glass and rubbed several times by the head of spoon, they exhibit stickiness. Also, when uniformly placed on a paper sheet and passed between pressed metal rollers, the particles are allowed to adhere to the sheet. It is considered from these experimental data that the liquid resin is fixed in the inside of the polymer particles.

In this way the polymer particles containing the prepolymer and if desired, the liquid resin are non-sticky, free-flowing particles, but exhibit a stickiness or adhesiveness to paper sheets by mechanically smashing. Further, resins non-copolymerizable with the polymerizable monomers may be used as the liquid resin to obtain polymer particles with desired properties. Also, polymer particles with controlled polymerization degree are obtained by varying the polymerization degree of the liquid resin.

Examples of the liquid resin are aromatic petroleum resins, e.g. Piccover resins (trade name, manufactured by Esso Pet. Chemical Company), $\alpha$-pinene resins, $\beta$-pinene resins, dipentene resins, terpene-phenol resin, $\alpha$-pinene-phenol resins, styrene resins, epoxy resins, polyamide resins and others. They may be used alone or in a mixture and the amount is within the range of preferably, 10–90%, more preferably 30–70% by weight of polymerizable monomers. In the case of less than 10% by weight, the effect is little, while in the case of more than 90% by weight sticky polymer particles are obtained.

The liquid resin used herein includes also a resin liquid at normal temperature containing a resin solid at normal temperature. Such solid resins are, for example, polystyrene, polyacrylate, polymethacrylate, vinyl type copolymers such as styrene-acrylonitrile-indene terpolymer and styrene-methylmethacrylate-butylmethacrylate terpolymer, polyamides, polyesters, polyvinyl acetate, ethylene-vinyl acetate copolymer, vinyl chloride-vinyl acetate-maleic anhydride copolymer, cellulose resins, coumarone-indene resins, epoxy resins, oil modified epoxy resins, rosin modified phenolic resins, rosin modified alkyd resins, dammar resins, ketone resins, maleic acid resins and the like. They may be used alone or in mixture. Also, the solid resins may be used in combination with rubbers such as cyclorubber and copal rubber, or waxes such as carnauba wax and microcrystalline wax. The solid resins are used in an amount of 5–20% by weight of the liquid resin. With addition of the solid resin, controlling of the polymer particle size becomes easier. In the case of less than 5% by weight the effect is little, while in the case of more than 20% by weight a further effect cannot be obtained.

When the liquid resin is used in combination with the prepolymer to obtain desired properties of polymer particles, the total amount of these two components may be within the range of 5–90% by weight of polymerizable monomers. With an amount of less than 5%, the effect is little, whereas with an amount of more than 90% sticky polymer particles are obtained.

The control of particle size relies chiefly on stirring strength, type of impellers and the like. Generally, the stronger stirring, the finer particle size is obtained. However, the stirring strength has its limit on a commercial scale and there is also the problem of penetration of air into a polymerization vessel through a stirring apparatus.

It has been found that a specific stirring apparatus can be used in the suspension system stabilized chemically according to this invention, which is obtained by the characteristic combination of polymerizable monomers with inorganic dispersion stabilizer. For example, there are TK Homomixer, TK Pipeline Homomixer (trade name, Tokushukika Kogyo Comp, Japan) and Microagiter (trade name, Shimazaki Seisakusho, Japan). These apparatuses consist of a high-speed rotating impeller (turbine) and a fixed impeller (stator) and form a precise, uniform and minute void between the two impellers. Strong action of shearing force, rupture, impact and turbulent flow formed in the minute void brings about effects of atomization, mixing, emulsification and dispersion. In these apparatuses the penetration amount of air during stirring is extremely low and accordingly, the polymer yield is not reduced.

In FIG. 1 representing a sectional view of TK Homomixer, 1: turbine shaft, 2: shaft, 3: bearing, 4: stator, 5: turbine.

It has been found that when these apparatuses are used, it is possible to industrially prepare polymer particles of less than $30\mu$ under the specified conditions, which have been deemed to be very difficult to prepare. The specific stirring apparatus enables to achieve the minimum particle size of $2-3\mu$. The specified conditions are as follows:

(1) The specific stirring apparatuses with high shearing forces are operated with a speed of more than 1000 rpm.

(2) Ionic substances are used in an amount of more than 0.4%, preferably 0.5% by weight of polymerizable monomers.

(3) Inorganic dispersion stabilizer is used in an amount of more than 0.4 phr by weight, preferably 0.5 phr by weight of polymerizable monomers.

A further explanation will be made in detail hereunder. Stirring is effected in the suspension polymerization system using the high shearing apparatus and 15–30 minutes after commencement of polymerization, a stable suspension of particles of less than $30\mu$ having approximately a uniform particle size distribution are observed with a microscope. Thereafter, till completion of the polymerization the particle size remains unchanged without coalescence of particles. Further, even if the high shearing and stirring apparatus is changed to conventional stirring apparatus when a stable suspension condition has been obtained after commencement of polymerization, the particle size remains unchanged without coalescence till completion of polymerization.

Particularly, in the case of difficultly water soluble or water insoluble cationic monomers (e.g. diethylaminoethyl methacrylate, diethylaminoethyl acrylate, N-n-butoxyacrylamide, vinylpyridine and the like) and difficulty water soluble organic amines, it is observed by a microscope that a stable suspension of particles of less than 30μ having approximately uniform particle size distribution are obtained after 15–30 minutes at normal temperature (a condition under which polymerization is not commenced) by means of the high shearing and stirring apparatus. Thereafter, even when the high shearing apparatus is changed to conventional stirring apparatus and the polymerization system is elevated to a certain temperature to effect polymerization, the particle size remains unchanged without coalescence of particles till completion of polymerization.

In methods using conventional suspending agents, particles of less than 30μ cannot be obtained with use of the above-mentioned specific stirring apparatus. Resins are formed in the precise, uniform and minute void between the turbine and the stator and eventually, gelation occurs. For overcoming these problems the specific stirring apparatus was changed to conventional stirring apparatus immediately before the formation of resins in the void, however, polymers containing irregular shapes and agglomerates were only obtained at the end of polymerization.

Also, when the specific stirring apparatus was changed to the conventional stirring apparatus 15–30 minutes after commencement of polymerization, polymer particles obtained at the end of polymerization had a broad particle size distribution containing sizes of more than 50μ, which were not different in any way from polymer particles obtained by effecting polymerization in the conventional stirring apparatus. Further, when stirring was effected using the high shearing apparatus for one hour at temperatures under which no polymerization is commenced and thereafter, the specific stirring apparatus was changed to the conventional stirring apparatus, polymer particles obtained at the end of polymerization were not in any way different from polymer particles obtained by effecting polymerization under the conventional stirring apparatus.

As apparent from the foregoing, the strong action of shearing force, rupture, impact and turbulent flow formed in the minute void between the turbine and the stator cannot be applied to effect a stable suspension polymerization according to conventional methods. It is clear that the above high shearing and stirring force can be employed in a suspension system electrically and chemically stabilized according to this invention.

Fine spherical polymer particles containing an inorganic pigment and/or black coloring agent according to this invention may be used in form of a dispersion in water as they are, or if desired, may be dried by means of conventional driers, e.g. a hot air circulating drier, a spray drier, a drum drier and a fluid type drier. The superiority of this invention is also observed in the drying step. In the conventional method using water-soluble high molecules such as polyvinyl alcohol, starch or gelatin as the suspending agent, when the above-mentioned drying process is carried out, the water-soluble high molecules serve as a binder so that polymer particles agglomerate and eventually, form a film in part. For avoiding such phenomena a filtrating step using a large amount of water is used to remove the water-soluble high molecules with washing, however, it results in lowering of productivity.

According to the process of this invention, polymer particles with a uniform particle size distribution obtained by polymerization can be dried immediately because no water-soluble high molecules as the suspending agent are used.

Fine spherical polymer particles of this invention containing an inorganic pigment and a black coloring agent, if desired have industrial advantages as follows:

(1) They may be used as a coloring agent.
(2) They have good impact strength and resistance toward mechanical friction.
(3) They have good flowability.
(4) They can be charged equally on the surface and either with negative or with positive by properly selecting polymerizable monomers, inorganic pigments and/or black coloring agents.
(5) When magnetic iron oxide, magnetic ferroalloy and the like are used as the inorganic pigment, polymer particles obtained are rendered magnetic so that they have magnetic response and are sensitive in magnetic field.

Thus, polymer particles containing an inorganic pigment and/or a black coloring agent which have characteristics as mentioned above can be applied in various fields, e.g. as powder or liquid paints for electrostatic coating, toners for electrostatography, toners for pressure fixing and toners for electrostatic printing.

This invention will be illustrated by the following Examples.

EXAMPLE 1

0.8 g of Aerosil 200 (trade name, manufactured by Degussa, West Germany) and 1,000 ml of distilled water were charged into a 3.0 l separable flask.

There was added a mixture of 250 g of ferrosoferric oxide, 0.8 g of dimethylaminoethyl methacrylate, 1.2 g of benzoyl peroxide, 80 g of Piccolastic A-5 (the trade name of styrene resin, manufactured by Esso Pet. Chemicals, U.S.A.), 80 g of NISSO-PB B-1000 (the trade name of butadiene homopolymer, manufactured by Nihon Soda Comp. Japan) and 240 g of styrene. The mixture was elevated to 90° C. while stirring at 100 rpm and polymerization was effected for six hours. After completion of polymerization black spherical particles of 40–50μ in average particle size were obtained and quite non-sticky.

EXAMPLE 2

4 g of Aerosil 380 (trade name, manufactured by Degussa) and 800 ml of distilled water were charged into a 2.0 l separable flask.

There was added a mixture of 40 g of rutile type titanium oxide, 2 g of dodecylamine, 1 g of azobisisobutyronitrile, a resin solution having 20 g of Hitanol 60G (the trade name of rosin-modified phenol resin, manufactured by Hitachi Kasei, Japan) dissolved in 140 g of Piccovar AP-10 (the trade name of aromatic petroleum resin, manufactured by Esso Pet. Chem., U.S.A.), 20 g of NISSO-PB BN-1000 (the trade name of maleic-modified polybutadiene, manufactured by Nihon Soda) and 220 g of styrene.

The mixture was heated to 80° C. while stirring at 100 rpm and polymerization was effected for six hours. After completion of polymerization white spherical particles of 40–50μ in average particle size were obtained.

Particles obtained have good flowability.

EXAMPLE 3

8 g of Aerosil 200 and 800 ml of distilled water were charged into a 2.0 l separable flask.

There was added a mixture of 15 g of Nigrosine NB conc (trade name, C. I. Acid Black 2, mfctd. by Sumitomo Chemicals, Japan), 2 g of diethylaminoethyl methacrylate, 1 g of 2,2′-azobis-(2,4-dimethylvaleronitrile), 160 g of NISSO-PBC-1000 (the trade name of α,ω-polybutadiene dicarboxylic acid, mfctd. by Nihon Soda) and 240 g of styrene. The mixture was heated to 65° C. while stirring at 200 rpm and polymerization was effected for six hours. After completion of polymerization spherical particles (black with blue-violet) of 100–120μ in average particle size were obtained.

Particles obtained cannot be melted even in boiling water.

EXAMPLE 4

4 g of Aerosil Mox 170 (trade name, mfctd. by Degussa) and 800 ml of distilled water were charged into a 2.0 l separable flask.

There was added a mixture of 50 g of Aizen Opal Black WGH (trade name, C. I. Acid Black 52, mfctd. by Hodogaya Kagaku Kogyo, Japan), 16 g of 2-hydroxy-3-acryloxypropyltrimethyl ammonium chloride, 1 g of lauroyl peroxide, 280 g of D.E.R. 332 (the trade name of epoxy resin, manufactured by Dow Chemical), 60 g of NISSO-PB B 2000 (the trade name of butadiene homopolymer, mfctd. by Nihon Soda) and 60 g of methyl methacrylate. The mixture was heated to 70° C. while stirring at 200 rpm and polymerization was effected for five hours. After completion of polymerization reddish black colored spherical particles of 30–40μ in average particle size were obtained.

When 1 g of the particles obtained was put uniformly on a paper sheet of A-4 size and passed between pressed metal rollers of 500 kg/30 cm long, they were fixed to the paper.

EXAMPLE 5

2 g of Aluminum Oxide C (trade name, mfctd. by Degussa) and 1000 ml of distilled water were charged into a 3.0 l separable flask.

There was added a mixture of 100 g of magnetic iron powders, 40 g of Diacryl Supra Black BSL (trade name, C. I. Basic Black 8, mfctd. by Mitsubishi Chemicals), 2 g of methacrylic acid, 4 g of azobisisobutyronitrile, a resin solution of 4 g of Nittetsu Coumarone Resin NT-1 (the trade name of coumarone resin, manufactured by Nittetsu Kagaku Kogyo, Japan) in 36 g of Versamid 140 (the trade name of polyamide resin, manufactured by Daiichi General, Japan), 10 g of NISSO-PB TE-2000 (the trade name of terminally acrylic-modified polybutadiene, mfctd. by Nihon Soda) and 350 g of methyl methacrylate. The mixture was heated to 80° C. while stirring at 200 rpm and polymerization was effected for five hours. After completion of polymerization black-brown spherical particles of 30–40μ in average particle size were obtained. The colored spherical resin particles were magnetic.

Particles obtained were non-sticky and had good flowability.

EXAMPLE 6

8 g of Aluminum Oxide C and 800 ml of distilled water were charged into a 2.0 l separable flask.

There was added a mixture of 150 g of α-iron sesquioxide, 15 g of Monarch #800 (the trade name of carbon black mfctd. by Cabot Corp.), 10 g of glycidyl methacrylate, 0.8 g of azobisisobutyronitrole, 40 g of acrylonitrile, 150 g of methyl methacrylate, 40 g of NISSO-PBG-1000 (the trade name of α,ω-polybutadiene glycol, mfctd. by Nihon Soda), 40 g of NISSO-PBTE-2000, and a resin solution of 40 g of Malkeed No. 5 (the trade name of rosin-modified alkyd resin, manufactured by Arakawa Rinsan, Japan) in 80 g of Piccolyte S-10 (the trade name of β-pinene resin, manufactured by Esso Pet. Chem.). The mixture was heated to 70° C. while stirring at 200 rpm and polymerization was effected for five hours. After completion of polymerization black spherical particles of 20–30μ in average particle size were obtained.

Particles obtained showed good flowability and when they were rubbed several times with the tip of spoon in a watch glass, they showed stickiness.

EXAMPLE 7

2 g of Aerosil 200 and 1,000 ml of distilled water were charged into a 3.0 l glass vessel.

There was added a mixture of 200 g of Printex G (the trade name of carbon black mfctd. by Degussa), 2 g of N-n-butoxyacrylamide, 1.2 g of benzoyl peroxide, 60 g of NISSO-PBB-1000 and 340 g of styrene. The mixture was heated to 80° C. while stirring at 1000 rpm using TK Homomixer (trade name, mfctd. by Tokushukika Kogyo Comp., Japan). Fifteen minutes after heating the particle size showed 15–20μ in average. After polymerization was conducted further six hours, the particle size remained unchanged and black spherical particles of 15–20μ in average particle size were obtained.

Particles obtained had good flowability.

EXAMPLE 8

4 g of Aerosil Mox 80 and 1000 ml of distilled water were charged into a 3.0 l glass vessel.

There was added a mixture of 150 g of a finely powdered nickel-iron-cobalt alloy, 4 g of dicocoamine, 1 g of azobisisobutyronitrile, 120 g of NISSO-PBG-1000 and 280 g of styrene. The mixture was heated to 80° C. while stirring at 3000 rpm using Microagitor (trade name, manufactured by Shimazaki Seisakusho, Japan). Fifteen minutes after heating the particle size was 10–15μ in average and remained unchanged even after completion of six hours' polymerization. Greenish black spherical particles of 10–15μ in average particle size were obtained.

Particles obtained showed good non-stickiness.

EXAMPLE 9

8 g of Aerosil 200 and 800 ml of distilled water were charged into a 2.0 l glass vessel.

There was added a mixture of 5 g of γ-iron sesquioxide, 20 g of Raven 500 (the trade name of carbon black, mfctd. by Columbia Comp., U.S.A.), 2 g of diethylaminoethyl methacrylate, 1 g of 2,2′-azobis-(2,4-dimethylvaleronitrile), 200 g of NISSO-PBC-2000 (the trade name of α,ω-polybutadiene dicarboxylic acid, mfctd. by Nihon Soda) and 200 g of styrene. The mixture was heated to 65° C. while stirring at 3000 rpm in use of TK Homomixer. Fifteen minutes after heating the particle size was 10–15μ in average and remained unchanged even after completion of six hours' polymerization. Black spherical particles of 10–15μ in average particle size were obtained.

Charging amount of the black resin particles was measured by the Blow off method. The value of +20 μc/g was obtained.

Particles obtained had good flowability, and softening point of which was 100° C. according to the ring and ball method. The particles were observed by a microscope and the particle number distribution is set forth in the following figure.

| | Particle Number Distribution % |
|---|---|
| 30–15 μ | 5 |
| 15–10 μ | 80 |
| 10– 5 μ | 10 |
| 5– 1 μ | 5 |

Figure 2:
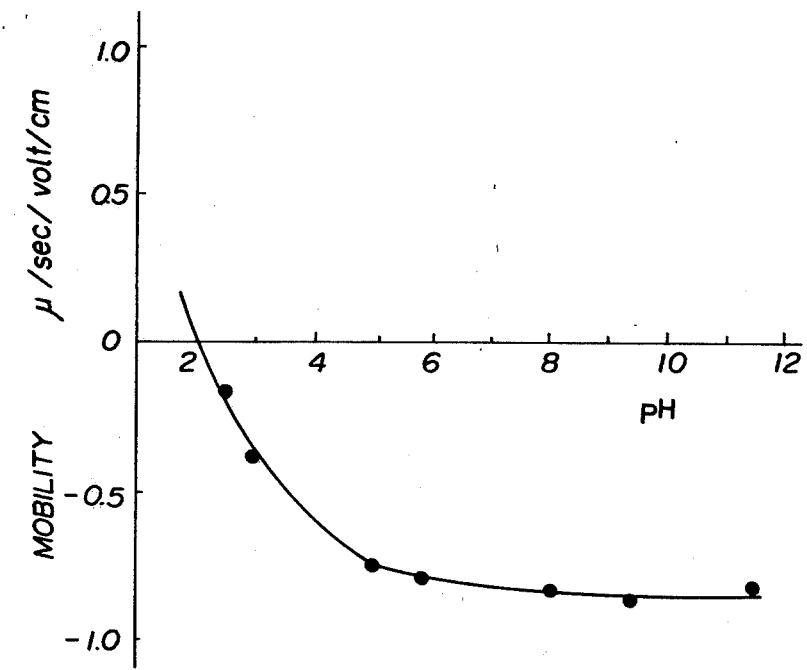
FIG. 2 represents a graph indicating test results of electrophoresis on a suspension of polymers in solution according to this invention.

1.0 ml of the suspension obtained in the procedure of Example 9 was added to 100 ml of distilled water. The resulting suspension having a pH of 5.9 was charged into a quartz cell of 1.0 mm in thickness and 70 cm in length and subjected to electrophoresis under applied voltage of 14 Volt/cm. Polymer particles were transferred to the anode and the mobility was $-0.8\mu$/sec/Volt/cm. The mobility was measured adjusting a pH with KOH or HCl. The results are given in FIG. 2.

EXAMPLE 10

8 g of Aerosil 200 and 800 ml of distilled water were charged into a 2.0 l glass vessel.

There was added a mixture of 5 g of Miketazol Black 5GF (trade name, C.I. Disperse Black 30 mfctd by Mitsui Toatsu Chemicals), 2 g of diethylaminoethyl methacrylate, 1 g of 2,2'-azobis-(2,4-dimethylvaleronitrile), 200 g of D.E.R. 330-J (the trade name of epoxy resin, manufactured by Dow Chemical), 40 g of a terminally acrylic-modified polybutadiene (NISSO-PB TE 1000, trade name by Nihon Soda) and 160 g of styrene. The mixture was heated to 65° C. while stirring at 3000 rpm using the TK Homomixer. Fifteen minutes after heating, the particle size was 10–15μ in average. Thereafter the specific stirring apparatus was changed to a conventional stirrer of 100 rpm and polymerization was continued for six hours. The particle size remained unchanged till completion of polymerization. Greenish black spherical particles of 10–15μ in average particle size were obtained.

When these particles were rubbed several times with the tip of spoon in a watch glass, they showed stickiness.

EXAMPLE 11

2 g of Aluminum Oxide C and 800 ml of distilled water were charged into a 2.0 l glass vessel.

There was added a mixture of 15 g of ultramarine, 2 g of acrylic acid, 1 g of azobisisobutyronitrile, 40 g of methyl methacrylate, 300 g of styrene resin (Piccolastic A-5, trade name) and 60 g of NISSO-PBB-3000 (butadiene homopolymer). The mixture was heated to 80° C. while stirring at 2000 rpm using the TK Homomixer. Thirty minutes after heating the particle size was 15–20μ in average, and remained unchanged even after polymerization for five hours. Blue spherical particles of 15–20μ in average particle size were obtained.

Particles obtained had good non-stickiness.

EXAMPLE 12

2 g of Aluminum Oxide C and 800 ml of distilled water were charged into a 2.0 l glass vessel.

There was added a mixture of 30 g of carbon black (MCF-88, trade name by Mitsubishi Chemicals), 2 g of acrylic acid, 1 g of azobisisobutyronitrile, 10 g of methyl methacrylate and 390 g of polybutadiene (NISSO-PBB-1000, trade name by Nihon Soda). The mixture was heated to 80° C. while stirring at 2000 rpm using the TK Homomixer. Thirty minutes after heating the particle size was 15–20μ in average. Thereafter the specific stirring apparatus was changed to a conventional stirrer of 100 rpm and polymerization was continued for five hours. The particle size remained unchanged till completion of polymerization. Yellowish black spherical particles of 15–20μ in average particle size were obtained.

Particles obtained had good non-stickiness.

EXAMPLE 13

8 g of Aerosil 200 and 1000 ml of distilled water were charged into a 3.0 l glass vessel.

There was added a mixture of 150 g of zinc green, 50 g of carbon black (Printex 400, trade name by Degussa), 2 g of diethylaminoethyl methacrylate, 1 g of 2,2'-azobis(2,4-dimethylvaleronitrile), a resin solution of 30 g of a styrene-methyl methacrylate-butyl methacrylate copolymer (softening point, about 120° C.) in 150 g of styrene resin (Piccolastic A-25, trade name), 20 g of a terminally half-esterified polybutadiene (NISSO-PBGM-1000, trade name by Nihon Soda) and 200 g of styrene. The mixture was stirred using the TK Homomixer of 3000 rpm at normal temperature. The particle size was 10–15μ in average 15–20 minutes after stirring. Thereafter the specific stirring apparatus was changed to a conventional stirrer of 100 rpm and polymerization was continued at 65° C. for six hours, during which the particle size remained unchanged. Greenish black spherical particles of 10–15μ in average particle size were obtained.

Particles obtained had good flowability.

EXAMPLE 14

Polymerization was conducted in the same manner as in Example 13 using N-n-butoxyacrylamide instead of diethylaminoethyl methacrylate. Black spherical particles of 10–15μ in average particle size were obtained.

Particles obtained had good flowability.

EXAMPLE 15

0.8 g of Aerosil 200 and 1,000 ml of distilled water were charged into a 3.0 l separable flask. There were added a mixture of 250 g of ferrosoferric oxide, 0.8 g of dimethylaminoethyl methacrylate, 1.2 g of benzol peroxide, 80 g of styrene resin (Piccoplastic A-5, trade name), 80 g of butadiene homopolymer (NISSO-PBB-1000), 238 g of styrene and 2 g of divinyl benzene. The mixture was elevated to 90° C. while stirring at 100 rpm and polymerization was effected for six hours. After completion of polymerization black spherical particles of 40–50μ in average particle size were obtained, which were quite non-sticky.

EXAMPLE 16

4 g of Aerosil 380 and 800 ml of distilled water were charged into a 2.0 l separable flask.

There were added a mixture of 40 g of rutile type titanium oxide, 2 g of dodecylamine, 1 g of azobisisobutyronitrile, a resin solution having 20 g of rosin-modified phenol resin (Hitanol 60G) dissolved in 140 g of aromatic petroleum resin (Piccovar AP-10), 20 g of maleic-modified polybutadiene (NISSO-PB BN-1000, trade name by Nihon Soda), 217 g of styrene and 3 g of divinyl benzene.

The mixture was heated to 80° C. while stirring at 100 rpm and polymerization was effected for six hours. After completion of polymerization white spherical particles of 40-50μ in average particle size having good flowability were obtained.

EXAMPLE 17

2 g of Aluminum Oxide C and 1000 ml of distilled water were charged into a 3.0 l separable flask.

There were added a mixture of 100 g of magnetic iron powders, 40 g of Diacryl Supra Black BSL (trade name, C. I. Basic Black 8), 2 g of methacrylic acid, 4 g of azobisisobutyronitrile, a resin solution of 4 g of coumarone resin (Nittetsu Coumarone Resin NT-1) in 36 g of polyamide resin (Versamide 140), 10 g of a terminally acrylic-modified polybutadiene (NISSO-PB TE-2000), 314 g of methyl methacrylate and 36 g of ethyleneglycol dimethacrylate. The mixture was heated to 80° C. while stirring at 200 rpm and polymerization was effected for five hours. After completion of polymerization black-blue spherical particles of 30-40μ in average particle size were obtained. These particles exhibited good flowability without stickiness.

Reference Example 1

A polymerization reaction mixture which was obtained from the same formulation as in Example 3 except diethylaminoethyl methacrylate was allowed to gel and no polymer particles were obtained.

Reference Example 2

A polymerization reaction mixture which was obtained from the same formulation as in Example 3 except Aerosil 200 was allowed to gel and no polymer particles were obtained.

Reference Example 3

4 g of a partially saponified polyvinyl alcohol (Gosenol, trade name) and 800 ml of distilled water were charged into a 2.0 l separable flask.

There was added a mixture of 20 g of carbon black (MA-100, trade name), 1 g of 2,2'-azobis-(2,4-dimethylvaleronitrile), 160 g of styrene resin (Piccolastic A-25, trade name) and 240 g of styrene. The mixture was heated to 65° C. while stirring at 200 rpm and subjected to polymerization for six hours. Then black spherical particles in mixture of 1-2 mm and 200-300μ in particle size were obtained.

Particles obtained had stickiness and were inferior in flowability.

Reference Example 4

Polymerization was conducted in the same manner as in Reference Example 3 except stirring at 400 rpm. The reaction products had strong monomer odour and the conversion was about 70 wt.%. According to the procedure of Reference Example 3, black spherical particles in mixture of 1-1.5 mm and 200-300μ in particle size were obtained.

Particles obtained were sticky and inferior in flowability, and further melt in a boiling water.

Reference Example 5

The polymerization reaction mixture of the same formulation as in Reference Example 3 was stably dispersed using the TK Homomixer of 3000 rpm for 30 minutes. Next, using a conventional stirrer of 200 rpm, the polymerization reaction mixture was heated to 65° C. and subjected to polymerization. Black spherical particles in mixture of 1-2 mm and 200-300μ in particle size were obtained.

Particles obtained were sticky and inferior in flowability.

What is claimed is:

1. Fine spherical polymer particles with a uniform particle size distribution which comprise polymerized products from ethylenically unsaturated polymerizable monomers having at least one prepolymer involved therein, and 0.2-2 phr by weight with respect to the polymerizable monomers of an inorganic dispersion stabilizer in which said polymerizable monomers are charged with 0.1-5% by weight with respect to the polymerizable monomers of a cation or anion, which is a cationic polymerizable monomer or a difficultly water soluble organic amine or an anionic polymerizable monomer, and said inorganic dispersion stabilizer has an opposite charge to said monomers, the surface of said polymer particles being firmly bound through ionic bond to and being completely covered with said inorganic dispersion stabilizer wherein said prepolymer is 5-90% butadiene homopolymer, α,w-polybutadiene glycol, α,w-polybutadiene dicarboxylic acid, maleic-modified polybutadienes, terminally acrylic-modified polybutadienes or terminally half-esterified polybutadienes or mixtures thereof.

2. A process for the preparation of fine spherical polymer particles with a uniform particle size distribution which comprises effecting a suspension polymerization of polymerized products from polymerizable monomers having a prepolymer involved therein and an inorganic dispersant in which said polymerizable monomers are charged in water (a) with cation by adding a cationic polymerizable monomer or difficultly water soluble organic amines or (b) with anion by adding an anionic polymerizable monomer and said inorganic dispersant in water has an opposite charge to said polymerizable monomers, and said suspension polymerization being under such a condition that the surface of the polymerizable monomer particles is ionically bound to and uniformly covered with said inorganic dispersion stabilizer wherein said prepolymer is butadiene homopolymer, α,w-polybutadiene glycol, α,w-polybutadiene dicarboxylic acid, maleic-modified polybutadienes or terminally half-esterified polybutadienes.

* * * * *